(12) United States Patent
Jadhav et al.

(10) Patent No.: US 11,360,952 B2
(45) Date of Patent: Jun. 14, 2022

(54) SYSTEM AND METHOD FOR MANAGING DATA MIGRATION BASED ON ANALYSIS OF RELEVANT DATA

(71) Applicant: Bank of America Corporation, Charlotte, NC (US)

(72) Inventors: Shashikant Sadashiv Jadhav, Commonwealth Close (SG); Amit Sarjerao Shinde, Corporation Road (SG)

(73) Assignee: Bank of America Corporation, Charlotte, NC (US)

( * ) Notice: Subject to any disclaimer, the term of this patent is extended or adjusted under 35 U.S.C. 154(b) by 59 days.

(21) Appl. No.: 16/983,097

(22) Filed: Aug. 3, 2020

(65) Prior Publication Data
US 2022/0035776 A1 Feb. 3, 2022

(51) Int. Cl.
*G06F 16/21* (2019.01)
*G06F 16/2452* (2019.01)
*G06F 16/248* (2019.01)
*G06F 12/122* (2016.01)
*G06F 16/22* (2019.01)
*G06F 16/17* (2019.01)

(52) U.S. Cl.
CPC .......... *G06F 16/214* (2019.01); *G06F 12/122* (2013.01); *G06F 16/1734* (2019.01); *G06F 16/221* (2019.01); *G06F 16/2282* (2019.01); *G06F 16/248* (2019.01); *G06F 16/2452* (2019.01)

(58) Field of Classification Search
CPC .. G06F 16/214; G06F 16/1734; G06F 16/221; G06F 16/2282; G06F 16/2452; G06F 16/248; G06F 12/122
See application file for complete search history.

(56) References Cited

U.S. PATENT DOCUMENTS

| | | |
|---|---|---|
| 7,305,400 B2 | 12/2007 | Keith, Jr. |
| 7,457,807 B2 | 11/2008 | O'Conor |
| 7,664,795 B2 | 2/2010 | Balin et al. |
| 7,685,177 B1 | 3/2010 | Hagerstrom et al. |
| 7,890,653 B2 | 2/2011 | Kutsumi et al. |
| 8,010,582 B2 | 8/2011 | Zimowski |
| 8,095,852 B2 | 1/2012 | Ko et al. |
| 8,140,604 B2 | 3/2012 | Ingen et al. |
| 8,150,817 B2 | 4/2012 | Kester et al. |
| 8,204,859 B2 | 6/2012 | Ngo |
| 8,311,974 B2 | 11/2012 | Gong |
| 8,326,896 B2 | 12/2012 | Cannon et al. |
| 8,463,749 B2 | 6/2013 | Zizys et al. |
| 8,554,744 B2 | 10/2013 | Cannon et al. |
| 8,606,760 B2 | 12/2013 | Wahlert et al. |

(Continued)

*Primary Examiner* — Albert M Phillips, III

(57) ABSTRACT

A system is configured for managing data migration from a legacy platform to a target platform is disclosed. The system determines relevant data for the data migration. The system determines frequently used relevant data, where the relevant data is determined to be frequently used when the relevant data is used more than an occurrence threshold number in a particular time period by the legacy platform. The system assigns a migration priority to the frequently used relevant data based on its frequency of occurrence. The system migrates the frequently used relevant data from the legacy platform to the target platform.

20 Claims, 3 Drawing Sheets

(56) References Cited

U.S. PATENT DOCUMENTS

| | | |
|---|---|---|
| 8,666,985 B2 | 3/2014 | Wood et al. |
| 8,984,269 B2 | 3/2015 | Ferris |
| 9,026,502 B2 | 5/2015 | Driesen et al. |
| 9,052,939 B2 | 6/2015 | Ferris |
| 9,069,985 B2 | 6/2015 | Ohazama et al. |
| 9,344,484 B2 | 5/2016 | Ferris |
| 9,430,505 B2 | 8/2016 | Padmanabhan et al. |
| 9,460,028 B1 | 10/2016 | Raizen et al. |
| 9,460,171 B2 | 10/2016 | Marrelli et al. |
| 9,483,558 B2 | 11/2016 | Brower, Jr. et al. |
| 9,519,695 B2 | 12/2016 | Sampathkumaran et al. |
| 9,578,052 B2 | 2/2017 | Cp et al. |
| 9,785,645 B1 | 10/2017 | Chen et al. |
| 9,892,146 B2 | 2/2018 | Levandoski et al. |
| 9,996,430 B2 | 6/2018 | Gokhale |
| 9,996,562 B2 | 6/2018 | Higginson et al. |
| 10,013,439 B2 | 7/2018 | Gruenheid et al. |
| 10,216,772 B2 | 2/2019 | Schuenzel et al. |
| 10,296,613 B2 | 5/2019 | Karandikar et al. |
| 10,311,078 B2 | 6/2019 | Bryan et al. |
| 2003/0034995 A1 | 2/2003 | Osborn et al. |
| 2005/0251533 A1 | 11/2005 | Harken et al. |
| 2005/0262129 A1 | 11/2005 | Hacigumus et al. |
| 2006/0230319 A1 | 10/2006 | Ryali et al. |
| 2008/0294790 A1 | 11/2008 | Alba |
| 2010/0211539 A1 | 8/2010 | Ho |
| 2010/0306493 A1* | 12/2010 | Carrillo ............... G06F 16/2282 711/167 |
| 2014/0223227 A1 | 8/2014 | Ingen et al. |
| 2015/0212894 A1 | 7/2015 | Pawar et al. |
| 2015/0212896 A1 | 7/2015 | Pawar et al. |
| 2015/0254257 A1 | 9/2015 | Kritchko et al. |
| 2015/0363458 A1 | 12/2015 | Cline et al. |
| 2017/0322996 A1 | 11/2017 | Horowitz et al. |
| 2018/0096045 A1 | 4/2018 | Merriman et al. |
| 2018/0285353 A1 | 10/2018 | Ramohalli Gopala Rao et al. |
| 2019/0042609 A1 | 2/2019 | Senthilnathan et al. |
| 2019/0163795 A1* | 5/2019 | Lai ...................... G06F 11/3485 |
| 2020/0133558 A1* | 4/2020 | Wang .................... G06F 3/0643 |
| 2021/0026707 A1* | 1/2021 | Rosenberg ............ G06F 9/5077 |
| 2021/0349874 A1* | 11/2021 | Zakas ................... G06F 16/221 |

* cited by examiner

SYSTEM AND METHOD FOR MANAGING DATA MIGRATION BASED ON ANALYSIS OF RELEVANT DATA

TECHNICAL FIELD

The present disclosure relates generally to data processing for data migration, and more specifically to a system and method for managing data migration based on analysis of relevant data.

BACKGROUND

In current data migration technologies, there is no consistent solution for selecting data for data migration from the current version of a system to a new version of the system. In some cases, the new version of the system may serve the same functions as the current version of the system, however, the new version of the system may be using new technologies and an improved design of the current version of the system. This poses challenges in data migration from the current version of the system to the new version of the system. In current data migration technologies, usually a system developer is required to investigate the design of the system, the operational flow of the system, and various governance processes related to the system to determine whether to select a particular data for data migration from the current version of the system to the new version of the system. In one example, consider a software application (associated with an organization) that has accumulated data for a long period, e.g., over 20 years. In such a case, it is difficult to select which portions of the accumulated data for data migration to a new version of the software application. In some cases, in addition to selecting data for data migration from the current version of the system to the new version of the system, different customizations may be required to be considered when selecting data for the new version of the system that will be launched in different regions or countries.

SUMMARY

In one embodiment, a system for managing data migration from a legacy platform to a target platform is disclosed. The system includes a memory operable to store different migration priorities associated with different subsets of data related to the legacy platform. The migration priorities indicate whether and when the different subsets of data related to the legacy platform will be migrated to the target platform. The system also includes a processor that is configured to determine relevant data for data migration from among data stored by the legacy platform to a target platform. The relevant data is determined based at least in part upon whether the data store by the legacy platform is used by the legacy platform. The legacy platform is configured to store the data in legacy platform log files, database access files, and memory dumps associated with the legacy platform. The processor determines frequently used relevant data, where the relevant data is determined to be frequently used when the relevant data is used more than an occurrence threshold number in a particular time period by the legacy platform. The processor assigns a migration priority to the determined frequently used relevant data based at least in part upon a frequency of occurrence of the frequently used relevant data. A first frequently used relevant data assigned with a high migration priority is migrated to the target platform before a second frequently used relevant data assigned with a low migration priority. The frequency of occurrence of the frequently used relevant data is determined based at least in part upon a number of times the frequently used relevant data is used in the particular time period by the legacy platform. The processor migrates the determined frequently used relevant data from the legacy platform to the target platform.

The existing data migration technologies lack capabilities to manage data migration from a legacy platform to a target platform based on a comprehensive analysis of relevant data with respect to the legacy platform. The lack of a comprehensive analysis of relevant data often causes selecting irrelevant data to be migrated from the legacy platform to the target platform. The lack of a comprehensive analysis of relevant data also causes not including all of the relevant data in the data migration from the legacy platform to the target platform. Additionally, the current data migration technologies require that the process of selecting data for the data migration to be performed or supervised by a person who has an extensive knowledge of the operational flow and functionalities of the legacy platform.

Certain embodiments of this disclosure provide unique solutions to technical problems of current data migration technologies, including those problems described above. For example, the disclosed system provides several technical advantages, which include: 1) determining relevant data for data migration from the legacy platform (i.e., the current version of the platform) to the target platform (i.e., the new version of the platform); 2) determining frequently used relevant data, where the relevant data is determined to be frequently used when it is used more than an occurrence threshold number in a particular time period by the legacy platform; and 3) assigning a migration priority to the determined frequently used relevant data based on its frequency of occurrence.

As such, this disclosure may improve the underlying operation of the computing platform by cleaning the database associated with the legacy platform from data rarely used or unused by the legacy platform. The disclosed system may also provide a practical application of facilitating to decide and plan for the data migration based on the comprehensive analysis of relevant data in a shorter time compared to the current data migration technologies. This, in turn, provides an additional practical application of reducing processing power, processing memory, and time in the data migration process which would otherwise be spent using the current data migration technologies. The disclosed system may also provide a practical application of providing a solution for accurately determining and selecting the relevant data in the data migration process.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
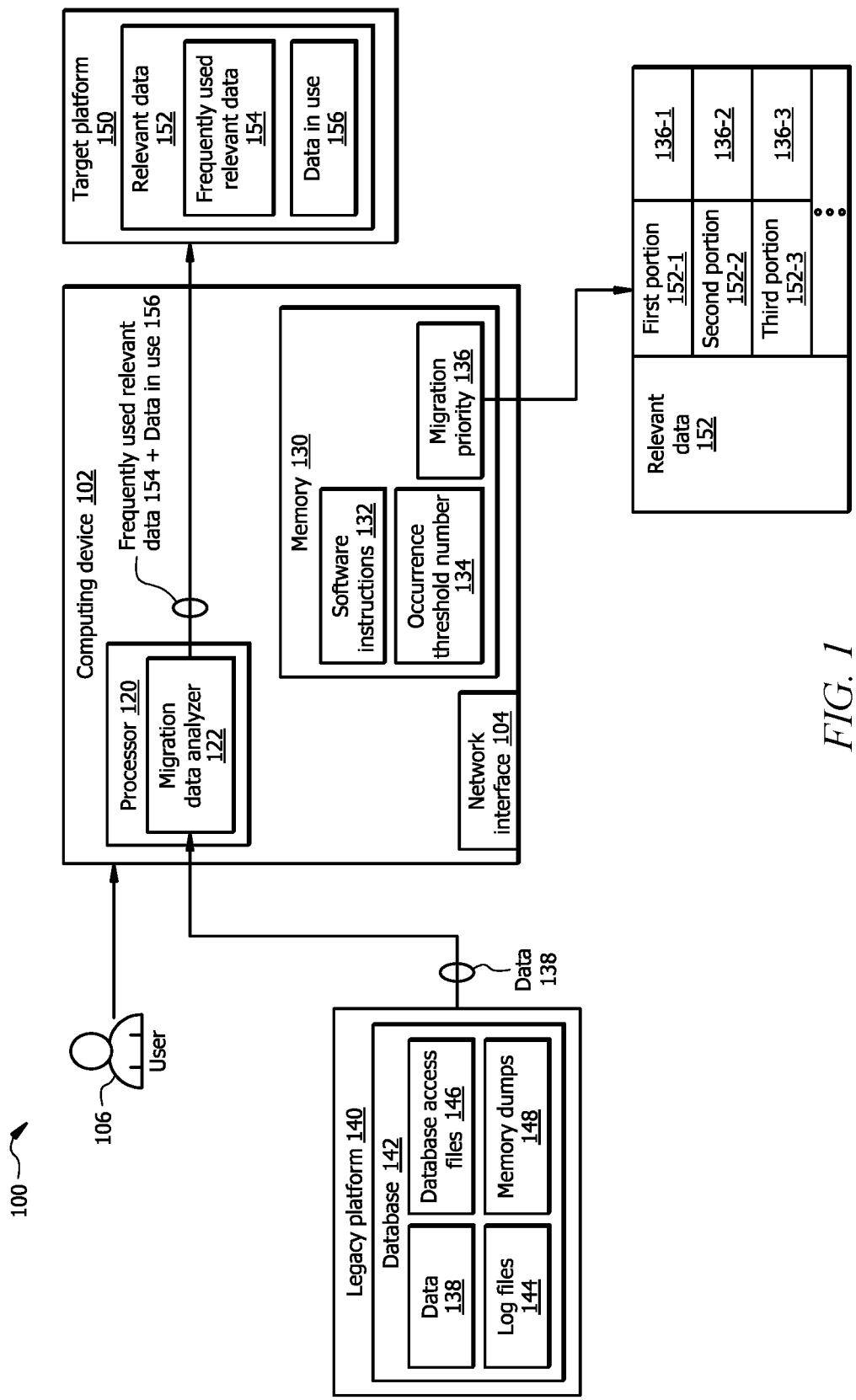
FIG. 1 illustrates one embodiment of a system configured to manage data migration from a legacy platform to a target platform.

FIG. 1 illustrates one embodiment of a system 100 configured to manage data migration from a legacy platform 140 to a target platform 150. In one embodiment, the system 100 comprises a computing device 102 that includes processor 120 in signal communication with a memory 130 and a network interface 104. Memory 130 includes software instructions 132 that when executed by the processor 120 cause the computing device 102 to perform one or more functions described herein. Memory 130 may also include an occurrence threshold number 134 and migration priority 136 which provide information that may be used by software instructions 132 and/or processor 120. In one embodiment, the processor 120 includes a migration data analyzer 122. In other embodiments, system 100 may not have all of the components listed and/or may have other elements instead of, or in addition to, those listed above.

In general, the system 100 improves the underlying function of data migration technologies by determining frequently used relevant data 154 associated with the legacy platform 140. The system 100 determines whether a portion of the data 138 (associated with the legacy platform 140) is a frequently used relevant data 154 by determining whether the data 138 is used by the legacy platform 140 more than the occurrence threshold number 134 in a particular time over a search period (e.g., more than one-hundred times per day over one year). The system 100 provides a solution for accurately determining the frequently used relevant data 154 for the data migration from the legacy platform 140 to the target platform 150.

Computing device 102 is generally any computing device configured to communicate with other computing devices, servers, etc. through the network interface 104. The computing device 102 is configured to perform specific functions described herein and interact with users 106, e.g., via user interfaces. Examples of computing device 102 include but not limited to desktop computers, mobile phones, tablet computers, laptop computers, servers, etc. In one example, the computing device 102 may be a backend server (associated with an organization) that maintains and manages the legacy platform 140 (associated with the organization).

Network interface 104 is configured to enable wired and/or wireless communications. The network interface 104 is configured to communicate data between the computing device 102 and other devices, systems, or domain(s). For example, the network interface 104 may comprise a WIFI interface, a local area network (LAN) interface, a wide area network (WAN) interface, a modem, a switch, or a router. The processor 120 is configured to send and receive data using the network interface 104. The network interface 104 may be configured to use any suitable type of communication protocol as would be appreciated by one of ordinary skill in the art.

Processor 120 comprises one or more processors operably coupled to network interface 104 and memory 130. The processor 120 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 120 may be a programmable logic device, a microcontroller, a microprocessor, or any suitable combination of the preceding. The one or more processors are configured to process data and may be implemented in hardware or software. For example, the processor 120 may be 8-bit, 16-bit, 32-bit, 64-bit, or of any other suitable architecture. The processor 120 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 132) to implement the migration data analyzer 122. In this way, processor 120 may be a special-purpose computer designed to implement the functions disclosed herein. In an embodiment, the processor 120 is implemented using logic units, FPGAs, ASICs, DSPs, or any other suitable hardware. The processor 120 is configured to operate as described in FIGS. 1-3. For example, the processor 120 may be configured to perform the steps of method 300 as described in FIG. 3.

Memory 130 may be volatile or non-volatile and may comprise a read-only memory (ROM), random-access memory (RAM), ternary content-addressable memory (TCAM), dynamic random-access memory (DRAM), and static random-access memory (SRAM). Memory 130 may be implemented using one or more disks, tape drives, solid-state drives, and/or the like. Memory 130 is operable to store the software instructions 132, occurrence threshold number 134, migration priority 136 and/or any other data or instructions. The software instructions 132, occurrence threshold number 134, and migration priority 136 may comprise any suitable set of instructions, logic, rules, or code operable to execute the processor 120. The stored software instruction 132, occurrence threshold number 134, and migration priority 136 are described in more detail below.

Legacy platform 140 may be any software application, web application, and/or software infrastructure that is associated with an organization. The legacy platform 140 may be configured to provide a service or a product to clients of the organization. The legacy platform 140 corresponds to the current version of the software application, web application, and/or software infrastructure. The target platform 150 corresponds to the new version of the software application, web application, and/or software infrastructure. The user 106 may be a developer employee associated with the organization and that wishes to migrate the legacy platform 140 (i.e., the current version of the software application, web application, and/or software infrastructure) to the target platform 150 (i.e., the new version of the software application, web application, and/or software infrastructure). As such, the user 106 sends a request to the migration data analyzer 122 to initiate the data migration from the legacy platform 140 to the target platform 150.

In one example, the legacy platform 140 may be a software application, web application, and/or software infrastructure associated with an e-commerce-related organization that provides an interactive user interface to clients of the organization to enable them to purchase products and/or services on the Internet. In another example, the legacy platform 140 may be a software application, web application, and/or software infrastructure associated with a financial organization that provides an interactive user interface to clients of the organization to enable them to transfer funds to other clients of the organization, manage loans of the clients, etc. The legacy platform 140 may be accessed from any computing device, such as a desktop computer, mobile phone, tablet computer, laptop computer, server, etc. associated with the organization. In an example where the legacy platform 140 is a web application, the legacy platform 140 may be accessed from a web browser when a user accesses a website of the organization. In an example where the legacy platform 140 is a software or mobile application, the legacy platform 140 may be available on a computing device when a user installs the mobile or software application on the computing device.

The legacy platform 140 may be associate with a database 142 that is configured to archive and maintain data 138 stored by the legacy platform 140. In one example, the database 142 may be stored in a local storage memory associated with the legacy platform 140, e.g., hard disk (HD), network-attached storage (NAS), etc. In another example, the database 142 may be stored in a remote storage memory associated with the legacy platform 140, such as cloud-based databases, etc. In one embodiment, the database 142 may include log files 144, database access files 146, memory dumps 148, etc.

The log files 144 may be implemented using any type of storage memory and configured to store records of functions that have been executed by the employees of the organization operating the legacy platform 140 to manage the data 138. In some examples, such functions may include, inserting, accessing, modifying, updating, extracting, and removing a particular data 138. In some examples, such functions may be performed by executing query statements, such as, for example, SQL, MySQL, Oracle, etc. statements. Examples of query statements are described in conjunction with the migration data analyzer 122. Typically, functions performed by the employees of the organization operating the legacy platform 140 may be stored in log files 144 for a long period, e.g., a few years. As such, the historical trend of functions that have been used to manage data 138 is used by the migration data analyzer 122 in determining whether to migrate a particular portion of relevant data 152.

The database access files 146 may be implemented using any type of storage memory and configured to store historical data 138 that have been stored and accessed by the employees of the organization operating the legacy platform 140.

The memory dumps 148 may be implemented using any type of storage memory and configured to store a portion of the data 138 that is in transit between the legacy platform 140 and other platforms via networks (i.e., data in use 156). Typically, the memory dumps 148 are implemented using high-speed cache memory storages to facilitate faster access to the stored data in use 156.

In one embodiment, the data-in-use 165 may be a portion of the frequently used relevant data 154 that is accessed by the legacy platform 140 more than the occurrence threshold number 134 in the particular time period over the search duration. In one example, the data in use 156 may include information related to clients of the organization, such as client names, addresses, etc. In another example, the data in use 156 may include information related to products and/or services that the organization provides to its clients, such as charges of the products and/or services, locations of the products and/or services, etc. In another example, the data in use 156 may include data that is traveling between a remote server associated with the legacy platform 140 and a computing device associated with a particular client of the organization when the particular client is ordering a service or a product from the user interface of the legacy platform 140 (available on the website of the organization or an installed application on the computing device). In another example, the data in use 156 may include generated data from performing the functions mentioned above by the legacy platform 140. In another example, the data in use 156 may include configuration data files which is used to enable the legacy platform 140 to perform its functions correctly. For example, the data in use 156 may include configuration data files that store backend and frontend functions and data associated with the legacy platform 140.

Migration Data Analyzer

Migration data analyzer 122 may be implemented using software instructions 132 executed by the processor 120, and is configured to determine the relevant data 152 from among the data 138 associated with the legacy platform 140. In one embodiment, the migration data analyzer 122 may determine the relevant data 152 by searching for a first plurality of specific keywords, strings, etc. in the database 142 and finding query statements which include one or more of the first plurality of specific keywords, strings, etc. In one example, the first plurality of specific keywords may include select, table, insert, column, etc. If the migration data analyzer 122 finds at least one query statement in which a particular data 138 is accessed by an employee of the organization (operating the legacy platform 140), the migration data analyzer 122 determines that the particular data 138 is a portion of the relevant data 152.

For example, assume that the first employee of the organization has made a customer table by executing a first query statement (in TABLE 1) in a user interface of a computing device associated with the organization and saved the customer table into the database 142. Also, assume that in executing the first query statement, the first employee inserted customer name, customer address, customer tax id, and customer occupation parameters into the customer table. Also, assume that the first and/or other employees of the organization have accessed customer name, customer address, and customer tax id parameters at different times for different purposes, e.g., generating an internal report, etc. The records of the employees of the organization accessing these portions of the data 138 are stored in the database 142 in the form of query statements with their corresponding timestamps which indicate the times they were executed. As such, in this particular example, the migration data analyzer 122 may search for the first plurality of specific keywords in the database 142 and find the following query statements and their timestamps, as below:

TABLE 1

Example of query statements with their timestamps

| No. | Found query statement | Timestamp |
|---|---|---|
| 1 | INSERT INTO customer table (customer name, customer address, customer tax id, customer occupation) | 12:00 pm 01:01:2020 |
| 2 | SELECT customer name FROM customer table | 2:00 pm 01:02:2020 |
| 3 | SELECT customer address FROM customer table | 3:00 pm 01:04:2020 |
| 4 | SELECT customer tax id FROM customer table | 4:00 pm 01:05:2020 |

In this particular example, the migration data analyzer 122 has found four query statements which include two of the first plurality of specific keywords (i.e., insert and select). The first query statement indicates that the first employee of the organization has inserted customer name, customer address, customer tax id, and customer occupation parameters into a customer table. The second query statement indicates that an employee of the organization has accessed the customer name parameter from the customer table. The third query statement indicates that an employee of the organization has accessed the customer address parameter from the customer table. The fourth query statement indicates that an employee of the organization has accessed the customer tax id parameter from the customer table. Thus, the migration data analyzer 122 determines that the customer name, customer address, and customer tax id parameters are used for at least one purpose and they are among the relevant data 152 associated with the legacy platform 140.

As can be observed from the TABLE 1, the customer occupation parameter has been inserted in the customer table (in the first query statement) but has never accessed by any of the employees of the organization for any purpose. Thus, the migration data analyzer 122 determines that the customer occupation parameter has not been accessed by any of the employees of the organization for any purpose (i.e., the customer occupation parameter has never been used by the legacy platform 140). As such, the migration data analyzer 122 determines that the customer occupation parameter is not among the relevant data 152 associated with the legacy platform 140 (i.e., it is an irrelevant data).

Determining Frequently Used Relevant Data

The migration data analyzer 122 is also configured to determine the frequently used relevant data 154. In one embodiment, the migration data analyzer 122 determines the frequently used relevant data 154 by searching for query statements which include a particular portion of the relevant data 152 and the first plurality of specific keyword (mentioned above) which are recorded frequently more than the occurrence threshold number 134 in a particular time over a search duration. The particular portion of the relevant data 152 may have been accessed by the employees of the organization at different times for different purposes by executing different query statements. For example, the particular portion of the relevant data 152 may have been accessed by the first employee of the organization at a first timestamp in the following query statement.

UPDATE customer name FROM customer table.

In another example, the particular portion of the relevant data 152 may have been accessed by a second employee of the organization at a second timestamp in the following query statement.

SELECT customer name FROM customer table.

In one example, the occurrence threshold number 134 maybe 100 times, 500, times, or any other suitable number of times. In one example, the particular time may be one day, one week, or any other suitable time duration. The user 106 operating the migration data analyzer 122 may select the search duration to find query statements with the first plurality of specific keywords. In one example, user 106 may select the search duration from a first specific calendar date until a second specific calendar date, for example, from 01.01.2010 to 01.01.2005. In another example, the user 106 may select the search duration from recent years until present, for example, from 01.01.2018 till present. In another example where the legacy platform has grown over a long period (e.g., 20 years), the user 106 may select the search duration from 20 years ago until the present.

Continuing the example above discussed in conjunction with TABLE 1, TABLE. 2 illustrates the example of a first portion of the relevant data 152-1 (i.e., the customer name parameter in the second query statement in TABLE. 1) with its occurrence count numbers in the particular time period (i.e., 24 hours) over the search duration.

TABLE 2

Example of the first portion of the relevant data 152-1 with its occurrence count numbers.

| Relevant data 152 | Time period | Occurrence count number |
|---|---|---|
| Customer name | 12:00 pm MM-DD-YY to 12:00 pm MM-(DD + 1)-YY | 120 |
| | 12:00 pm MM-(DD + 1)-YY to 12:00 pm MM-(DD + 2)-YY | 130 |
| | 12:00 pm MM-(DD + 2)-YY to 12:00 pm MM-(DD + 3)-YY | 150 |
| | etc. | above 100 |

In TABLE. 2, the month, day, and year are shown as MM, DD, and YY, respectively. As can be observed from the TABLE. 2, the customer name parameter is found frequently or consistently over 100 times every day over the search duration in the database 142. As such, the migration data analyzer 122 determines that the customer name is a portion of the frequently used relevant data 154. Thus, the migration data analyzer 122 will consider the customer name for data migration to the target platform 150.

TABLE. 3, illustrates the example of the second portion of the relevant data 152-2 (the customer address parameter in the third query statement in TABLE. 1) with its occurrence count numbers in the particular time period (i.e., 24 hours) over the search duration.

TABLE 3

Example of the second portion of the relevant data 152-2 with its occurrence count numbers.

| Relevant data 152 | Time period | Occurrence count number |
|---|---|---|
| Customer address | 12:00 pm MM-DD-YY to 12:00 pm MM-(DD + 1)-YY | 110 |
| | 12:00 pm MM-(DD + 1)-YY to 12:00 pm MM-(DD + 2)-YY | 120 |
| | 12:00 pm MM-(DD + 2)-YY to 12:00 pm MM-(DD + 3)-YY | 80 |
| | etc. | Above or below 100 |

In TABLE. 3, the month, day, and year are shown as MM, DD, and YY, respectively. As can be observed from the TABLE. 3, the customer address parameter is found over 100 times in a plurality of days and below 100 times in other days over the search duration. As such, the migration data analyzer 122 may determine whether the customer address parameter is found over 100 times in a majority of days of the search duration. In one embodiment, if the migration data analyzer 122 determines that the customer address parameter is found over 100 times in a majority of days of the search duration, the migration data analyzer 122 may determine that the customer address parameter is a portion of the frequently used relevant data 154. Thus, the migration data analyzer 122 will consider the customer address parameter for data migration to the target platform 150.

If, however, the migration data analyzer 122 determines that the customer address parameter is found below 100 times in a majority of days of the search duration, the migration data analyzer 122 may determine that the customer address parameter is not a portion of the frequently used relevant data 154 (i.e., it is a portion of irrelevant data with respect to legacy platform 140). Thus, the migration data analyzer 122 will not consider the customer address for data migration to the target platform 150.

In one embodiment, the migration data analyzer 122 is configured to determine whether the portions of the relevant data 152 have occurred more than the occurrence threshold number 134 with an added variance tolerance number over the search duration. For example, assume that the customer address parameter is found close but below 100 times per day in a majority of days of the search duration. The migration data analyzer 122 adds a variance tolerance number (e.g., 10) to the occurrence count numbers of the customer address parameter and determines whether the occurrence count numbers of the customer address parameter with the added variance tolerance number are above the occurrence threshold number 134. For example, assume that the customer address parameter is found between 90 and 100 times per day in 95% of the search duration. Thus, after adding the variance tolerance number (e.g., 10) to the occurrence count numbers of the customer address parameter, the migration data analyzer 122 determines that the customer address parameter is frequently occurred more than the occurrence threshold number 134. Consequently, the migration data analyzer 122 determines that the customer address is a portion of the frequently used relevant data 154. Thus, the migration data analyzer 122 will consider the customer address for data migration to the target platform 150.

TABLE. 4, illustrates the example of the third portion of the relevant data 152-3 (the customer tax id parameter in the fourth query statement in TABLE. 1) with its occurrence count numbers in the particular time period (i.e., 24 hours) over the search duration.

TABLE 4

Example of the third portion of the relevant data 152-3 with its occurrence count numbers.

| Relevant data 152 | Time period | Occurrence count number |
|---|---|---|
| Customer tax id | 12:00 pm MM-DD-YY to 12:00 pm MM-(DD + 1)-YY | 50 |
|  | 12:00 pm MM-(DD + 1)-YY to 12:00 pm MM-(DD + 2)-YY | 40 |
|  | 12:00 pm MM-(DD + 2)-YY to 12:00 pm MM-(DD + 3)-YY | 90 |
|  | etc. | Below 100 |

In TABLE. 4, the month, day, and year are shown as MM, DD, and YY, respectively. As can be observed from the TABLE. 4, the customer tax is parameter is found consistently below 100 times per day over the search duration. As such, the migration data analyzer 122 determines that the customer tax id parameter is not a portion of the frequently used relevant data 154. Thus, the migration data analyzer 122 will not consider the customer tax id parameter for data migration to the target platform 150.

In a particular embodiment, the migration data analyzer 122 is configured to determine frequently used relevant data 154 with respect to a specific geo-location region or country. In a case where the target platform 150 is expected to launch in a specific geo-location region or country, the migration data analyzer 122 determines the frequently used relevant data 154 with respect to the specific geo-location region or country. In such embodiments, the migration data analyzer 122 may exclude portions of relevant data 152 which are not related to the specific geo-location region or country. For example, assume that the target platform 150 is expected to launch in the United States. Thus, the migration data analyzer 122 may determine the relevant data 152 by searching for query statements which include a particular data 138, the first plurality of specific keywords (mentioned above), and keywords related to the United States, such as, for example, Social Security Number (SSN), US customer tax id, etc. In this particular example, assume that the migration data analyzer 122 have found the following query statements.

SELECT customer SSN FROM customer table;
SELECT US customer tax id FROM customer table; and
SELECT Jakarta customer tax id FROM customer table.

Also, assume that the customer SSN, US customer tax id, and Jakarta customer tax id parameters are found more than the occurrence threshold number 134 over the particular time period over the search period. As such, the migration data analyzer 122 determines that the customer SSN and US customer tax id parameters are portions of the frequently used relevant data 154 with respect to the country of the United States. Thus, the migration data analyzer 122 considers the customer SSN and US customer tax id parameters for data migration to the target platform 150 which is expected to be launched in the United States. In this particular example, the migration data analyzer 122 may not consider the Jakarta customer tax id parameter in migrating to the target platform 150 which is expected to launch in the United States.

The migration data analyzer 122 is also configured to determine statistical data pattern of the frequently used relevant data 154. For example, once the migration data analyzer 122 has found the query statements which include a particular portion of the relevant data 152 from the database 142, it may extract meaningful statistical information from the found query statements. In one example, in determining relevant data 152, assume that the migration data analyzer 122 has found the following query statement which indicates that an employee of the organization has accessed the customer names from the customer table.

SELECT customer name FROM customer table.

The result of this query statement may be a table that includes different types of customers, such as individual customers, group customers, small business customers, large business customers, etc. Thus, the migration data analyzer 122 may extract meaningful statistical information from this and other query statements related to the customer parameter, such as that there are 10 unique customer types are stored in the customer table. With the gathered statistical information from the found query statements, the migration data analyzer 122 may identify the expected relevant data and compare them with the found relevant data 152. If the migration data analyzer 122 finds a particular query statement that includes a particular relevant data that differs from the expected relevant data 152 (e.g., due to an error in storing the particular relevant data in the database 142 by an employee of the organization), the migration data analyzer 122 determines that the particular query statement is an outlier. Thus, the migration data analyzer 122 excludes the particular query statement from determining the relevant data 152.

Continuing the above example, if the migration data analyzer 122 finds a particular query statement which shows a customer type that is not among the 10 unique customer types, the migration data analyzer 122 determines that the particular query statement is an outlier and excludes the particular query statement from determining the relevant data 152.

Determining Data in Use

The migration data analyzer 122 is also configured to determine the data in use 156 stored in database 142. In one embodiment, the migration data analyzer 122 may determine the data in use 156 by searching for a second plurality of specific keywords, strings, etc. in the memory dumps 148 and finding query statements which include the second plurality specific keywords, strings, etc. In one example, the second plurality of specific keywords may include cache, store, select, etc. As discussed above, the data in use 156 may include data that is in transit between the legacy platform 140 and other platforms through networks and data that is generated from the execution of functions, query statements, etc. by the legacy platform 140.

If the migration data analyzer 122 finds a query statement which includes a particular data 138 and any of the second plurality of specific keywords, strings, etc., the migration data analyzer 122 determines that the particular data 138 is a portion of the data in use 156. For example, in an e-commerce organization which provides an interface to enable its clients to purchase products on the Internet, information related to products and product charges are consistently in use by the legacy platform 140. Thus, the products and product charges may be stored in the memory dumps 148 by executing the following query statements below.

CACHE SELECT * FROM Product; (or STORE SELECT * FROM Product) and

CACHE SELECT * FROM Product charges (or STORE SELECT * FROM Product charges).

In this particular example, in searching for query statements with a particular data 138 and the second plurality of specific keywords, strings, etc., the migration data analyzer 122 may find these query statements and determine that information related to products, such as types, IDs, descriptions, locations, etc. and information related to product charges, such as charge amounts, charge tax amounts, discount percentages, etc. are among the data in use 156. The migration data analyzer 122 may also determine the frequency of occurrence that a particular data 138 is accessed after it is stored in the memory dumps 148, as described above in conjunction with the frequently used relevant data 154. Once the migration data analyzer 122 determines the frequently used relevant data 154 and data in use 156, it assigns migration priorities 136 to them in order to determine whether to migrate them and determine the order of data migration. Details of the operation of assigning migration priorities 136 to the frequently used relevant data 154 and data in use 156 are described in FIG. 2.

Figure 2:
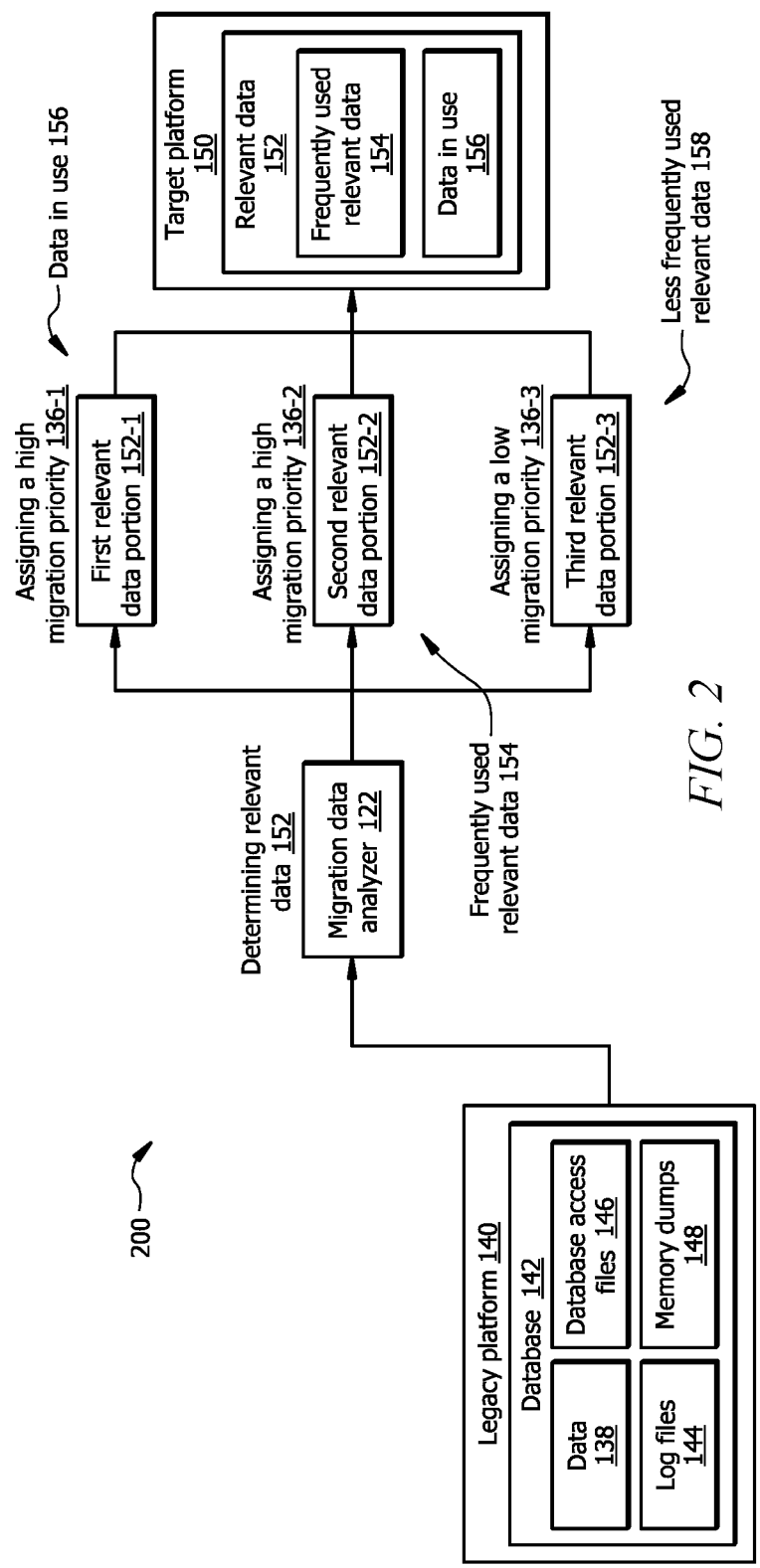
FIG. 2 illustrates one embodiment of an operational flow of the system depicted in FIG. 1.

FIG. 2 illustrated an operation of the migration data analyzer 122 for assigning migration priorities 136 to the frequently used relevant data 154 and data in use 156. In one embodiment, the migration data analyzer 122 assigns the migration priorities 136 to the frequently used relevant data 154 and data in use 156 based on their corresponding frequency of occurrences in searching for query statements which include the first plurality and the second plurality of specific keywords, strings, etc., respectively.

In a first example, assume that the first portion of relevant data 152-1 includes a portion of the data in use 156 stored in the memory dumps 148 by a query statement (that includes the second plurality of specific keywords). As such, the first portion of relevant data 152-1 is consistently in transit between the legacy platform 140 and other platforms via networks. Thus, the migration data analyzer 122 assigns a high migration priority 136-1 to the first portion of relevant data 152-1.

In a second example, assume that the second portion of relevant data 152-2 includes a portion of frequently used relevant data 154 that has consistently occurred in query statements (that include the first plurality of specific keywords) more than the occurrence threshold number 134 by a large margin in the particular time period over the search duration, e.g., over 200 times per day over one year. As such, the migration data analyzer 122 assigns a high migration priority 136-2 to the second portion of relevant data 152-2.

Continuing the second example, assume that the second portion of relevant data 152-2 has occurred in query statements (that include the first plurality of specific keywords) over the occurrence threshold number 134 by a small margin in a majority of days in the particular time period over the search duration, e.g., between 100 and 110 times in a majority of days over the search duration. Also, assume that the second portion of relevant data 152-2 has occurred in query statements (that include the first plurality of specific keywords) below the occurrence threshold number 134 by a small margin in a minority of days in the particular time period over the search duration, e.g., between 90 and 100 times per day in a minority days over the search duration. As such, the migration data analyzer 122 assigs a medium migration priority 136-2 to the second portion of relevant data 152-2.

In a third example, assume that the third portion of the relevant data 153-3 includes a portion of the less frequently used relevant data 158 that has consistently occurred in query statements (that include the first plurality of specific keywords) below the occurrence threshold number 134 in the particular time period over the search duration, e.g., below 100 times per day over the search duration. As such, the migration data analyzer 122 assigns a low migration priority 136-3 to the third portion of relevant data 152-3. The migration data analyzer 122 is configured to migrate the portions of relevant data 152 which are assigned with high migration priorities 136 first; and the portions of relevant data 152 which are assigned with medium migration priorities 136 second.

In one embodiment, the migration data analyzer 122 may provide an option to the user 106 (who initiated the data migration from the legacy platform 140 to the target platform 150) to choose whether to migrate the portions of relevant data 152 which are assigned with low and/or medium migration priorities 136. If the user 106 chooses to migrate the portions of relevant data 152 assigned with low and/or medium migration priorities 136, the migration data analyzer 122 migrates those portions of relevant data 152 to the target platform 150 after it migrates the portions of relevant data 152 assigned with high migration priorities 136 to the target platform 150. If the user 106 chooses not to migrate the portions of relevant data 152 assigned with low and/or medium migration priorities 136, the migration data analyzer 122 will not migrate those portions of relevant data 152 to the target platform 150.

Figure 3:
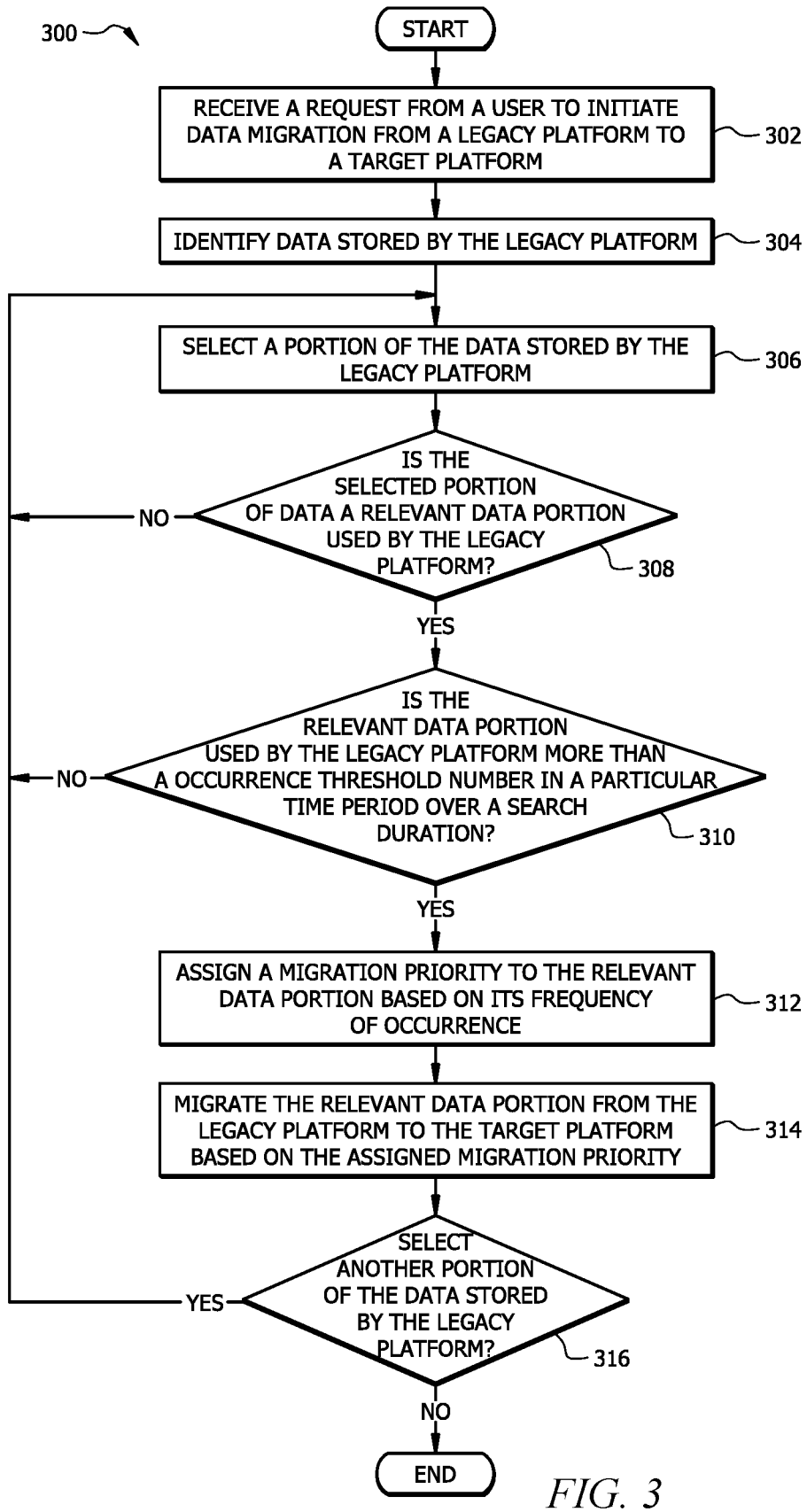
FIG. 3; illustrates an example flow chart of a method for managing data migration from a legacy platform to a target platform.

Example of a Method for Managing Data Migration from a Legacy Platform to a Target Platform FIG. 3 illustrates a flow chart of a method 300 for managing data migration from the legacy platform 140 to the target platform 150. One or more steps 302-316 of the method 300 may be implemented, at least in part, in the form of software instructions 1332 stored on non-transitory, tangible, machine-readable media (e.g., memory 130) that when run by one or more processors (e.g., processor 120) may cause the one or more processors to perform steps 302-316. In some embodiments, method 300 may be performed on system 100 of FIG. 1, including the computing device 102, processor 120, and the migration data analyzer 122. Aspects of the steps 302-316 of the method 300 have been covered in the description for FIGS. 1-2; and additional aspects are provided below.

The method 300 begins at step 302 where the user 106 sends a request to the migration data analyzer 122 to initiate data migration from the legacy platform 140 to the target platform 150. For example, the user 106 may send the request to the migration data analyzer 122 by a user interface of the computing device 102, etc. In one example, the computing device 102 may a backend server (associated with the organization) that maintains and manages the legacy platform 140 (associated with the organization).

In step 304, the migration data analyzer 122 identifies the data 138 which is stored by the legacy platform 140, for example in log files 144, database access files 146, memory dumps 148, etc.

In step 306, the migration data analyzer 122 selects a portion of the data 138 for evaluation. The migration data analyzer 122 iteratively selects a portion of the data 138 from among the data 138 for evaluation.

In step 308, the migration data analyzer 122 determines whether the selected data portion 138 is a portion of the relevant data 152 (e.g., the first relevant data portion 152-1) used by the legacy platform 140. In one embodiment, the migration data analyzer 122 may search the database 142 to find query statements which include the selected data portion 138 and any of the first plurality of specific keywords, such as, for example, select, table, insert, column, etc., as described in FIG. 1. If the migration data analyzer 122 finds any records of query statements in which the selected data portion 138 is accessed (by any of the employees of the organization), the migration data analyzer 122 determines that the selected data portion 138 is a portion of the relevant data 152. If, however, there are no records of query statements that indicate that the selected portion of data 138 is accessed (by any of the employees of the organization), the migration data analyzer 122 determines that the selected portion of data 138 is unused data. In other words, the migration data analyzer 122 determines that the selected portion of data 138 is a portion of irrelevant data with respect to the legacy platform 140.

If the migration data analyzer 122 determines that the selected portion of data 138 is not used by the legacy platform 140 for any purpose, the method 300 returns to step 306 where the migration data analyzer 122 selects another portion of the data 138 for evaluation. If the migration data analyzer 122 determines that the selected portion of data 138 is used by the legacy platform 140 for any purpose, the method 300 proceeds to step 310.

In step 310, the migration data analyzer 122 determines whether the relevant data portion 152-1 is used by the legacy platform 140 more than the occurrence threshold number 134 (e.g., 100 times, 150 times, etc.) in a particular time period (e.g., one day, one week, etc.) over a search duration (e.g., one year, ten years, etc.) as described in FIG. 1. For example, the migration data analyzer 122 searches for query statements that include the first plurality of specific keywords, such as select, table, insert, column, etc. and their corresponding occurrence count numbers in the particular time period over the search duration.

In one example, assume that the relevant data portion 152-1 is the customer name parameter in the following query statement found by the migration data analyzer 122 in the database 142.

SELECT customer name FROM customer table.

The migration data analyzer 122 determines the occurrence count numbers of the customer names in this and other query statements stored in the database 142 in the particular time period over the search duration and determines whether its occurrence count numbers are consistently more than the occurrence threshold number 134 over the search duration.

If the migration data analyzer 122 determines that the occurrence count numbers of the relevant data portion 152-1 are consistently less than the occurrence threshold number 134, the migration data analyzer 122 determines that the relevant data portion 152-1 is not a portion of the frequently used relevant data 154 (i.e., the relevant data portion 152-1 is a portion of less frequently used relevant data 158), as described in FIGS. 1 and 2. Thus, the method 300 returns to step 306, where the migration data analyzer 122 selects another portion of the data 138 for evaluation.

If, however, the migration data analyzer 122 determines that the occurrence count numbers of the relevant data portion 152-1 is consistently more than the occurrence threshold number 134, the migration data analyzer 122 determines that the relevant data portion 152-1 is a portion of the frequently used relevant data 154. Thus, the method 300 proceeds to step 312.

In step 312, the migration data analyzer 122 assigns a migration priority 136-1 to the relevant data portion 152-1 based on the frequency of occurrence of the relevant data portion 152-1, as described in FIGS. 1 and 2.

In a first example, assume that the first relevant data portion 152-1 is a portion of frequently used relevant data 154 which is consistently occurred by a large margin more than the occurrence threshold number 134 over the search duration. As such, the migration data analyzer 122 assigns a high migration priority 136-1 to the first relevant data portion 152-1.

In a second example, assume that the first relevant data portion 152-1 is a portion of data in use 156 which is consistently in transit between the legacy platform 140 and other platforms via networks, thus, consistently occurs above the occurrence threshold number 134 by a large margin over the search duration. As such, the migration data analyzer 122 assigns a high migration priority 136-1 to the first relevant data portion 152-1.

In a third example, assume that the first relevant data portion 152-1 is a portion of less frequently used relevant data 158 which is consistently occurred less than the occurrence threshold number 134 over the search period. As such, the migration data analyzer 122 assigns a low migration priority 136-1 to the first relevant data portion 152-1.

In step 314, the migration data analyzer 122 migrates the relevant data portion 152-1 from the legacy platform 140 to the target platform 150 based on the assigned migration priority 136-1. In one embodiment, if the relevant data portion 152-1 is assigned with a high migration priority 136-1, the migration data analyzer 122 migrates the relevant data portion 152-1 before other portions of relevant data 152. In one embodiment, if the relevant data portion 152-1 is assigned with a low or a medium migration priority 136, the migration data analyzer 122 may hold the relevant data portion 152-1 in a migration queue until all the portions of relevant data 152 assigned with high migration priority 136 are migrated to the target platform 150. In one embodiment, the migration data analyzer 122 may provide an option to the user 106 to choose whether to migrate the relevant data 152-1 that is assigned with a low or a medium migration priority 136.

In step 316, the migration data analyzer 122 determines whether to select another portion of data 138 for evaluation. Here, the migration data analyzer 122 determines whether all portions of the data 138 have been evaluated. The migration data analyzer 122 determines to select another portion of data 138 when at least one portion of data 138 has not been evaluated.

If the migration data analyzer 122 determines that at least one portion of data 138 has not been evaluated, the method 300 returns to step 306, where the migration data analyzer 122 selects another portion of data 138 for evaluation. Otherwise, the method 300 is concluded.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim

The invention claimed is:

1. A system for managing data migration from a legacy platform to a target platform, comprising:
a memory operable to store different migration priorities assigned to different subsets of data related to the legacy platform, the migration priorities indicate whether and when the different subsets of data related to the legacy platform will be migrated to the target platform; and
a processor operably coupled to the memory, configured to:
receive, via a network, the data stored by the legacy platform;
determine relevant data for data migration from among data stored by the legacy platform, wherein:
the relevant data is determined based at least in part upon whether the data stored by the legacy platform is used by the legacy platform, and
the legacy platform is configured to store the data in legacy platform log files, database access files, and memory dumps associated with the legacy platform;
determine expected relevant data by determining different types of the relevant data;
update the determined relevant data by:
finding a query statement that is used to access a particular type of the relevant data;
determining that the query statement is an outlier query statement based at least in part upon determining that the particular type of the relevant data is an outlier relevant data that is not among the expected relevant data; and
excluding the outlier query statement from query statements used in determining the relevant data;
determine frequently used relevant data, wherein the relevant data is determined to be frequently used when the relevant data is used more than an occurrence threshold number in a particular time period by the legacy platform;
assign a migration priority to the determined frequently used relevant data based at least in part upon a frequency of occurrence of the frequently used relevant data, wherein:
a first frequently used relevant data assigned with a high migration priority are migrated to the target platform before a second frequently used relevant data assigned with a low migration priority; and
the frequency of occurrence of the frequently used relevant data is determined based at least in part upon a number of times the frequently used relevant data is used in the particular time period by the legacy platform, migrate the determined frequently used relevant data from the legacy platform to the target platform and prevent migration of the determined outlier relevant data from the legacy platform to the target platform, thereby improving accuracy in selecting the relevant data for the data migration; and
remove unused and rarely used data from the legacy platform, thereby cleaning a database associated with the legacy platform from the unused data and the rarely used data.

2. The system of claim 1, wherein the frequently used relevant data comprises data in use, the processor is further configured to:
determine data-in-use stored in the memory dumps associated with the legacy platform, wherein the data-in-use is consistently in transit between the legacy platform and other platforms;
assign a high migration priority to the data-in-use; and
migrate the data-in-use from the legacy platform to the target platform.

3. The system of claim 1, wherein the processor is further configured to:
determine less frequently used relevant data, wherein the relevant data is determined to be less frequently used when the relevant data is used less than the occurrence threshold number in the particular time period by the legacy platform;
assign a low migration priority to the less frequently used relevant data; and
migrate the less frequently used relevant data from the legacy platform to the target platform after migrating the frequently used relevant data from the legacy platform to the target platform.

4. The system of claim 1, wherein determining the relevant data comprises:
searching for particular keywords used in query statements in one or more of the legacy platform log files, the database access files, and the memory dumps associated with the legacy platform, wherein the query statements are used to access the relevant data, the particular keywords comprise select, table, insert, and column;

determining whether results of the query statements are used for any purpose by the legacy platform; and in response to determining that the results of the query statements are used for at least one purpose by the legacy platform, determining that the data is relevant.

5. The system of claim 4, wherein determining the frequently used relevant data comprises:

determining a number of times, the query statements are used to access the relevant data;

determining whether the number of times the query statements are used to access the relevant data is higher than the occurrence threshold number in the particular time period; and in response to determining that the number of times the query statements are used to extract the relevant data is higher that the occurrence threshold number in the particular time period, determine that the relevant data is frequently used, wherein the particular time period is configurable.

6. The system of claim 1, wherein when the target platform is expected to be launched in a particular geo-location region, the relevant data is determined based at least in part upon the relevant data being used in the particular geo-location region.

7. The system of claim 1, wherein the processor is further configured to:

determine a data pattern of the determined relevant data, wherein the data pattern of the determined relevant data provides statistical information with respect to the relevant data.

8. The system of claim 1, wherein:

the legacy platform log files comprise records of functions that have been performed by the legacy platform, wherein the functions comprise query statements to manage the data related to the legacy platform;

the database access files comprise data that have been accessed by the legacy platform in performing the functions; and the memory dumps comprise data which have been generated from performing the functions by the legacy platform and configuration data which is used to enable the legacy platform to perform its functions.

9. A method for managing data migration from a legacy platform to a target platform, comprising:

receiving, via a network, the data stored by the legacy platform;

determining relevant data for data migration from among data stored by the legacy platform, wherein:

the relevant data is determined based at least in part upon whether the data stored by the legacy platform is used by the legacy platform, and the legacy platform is configured to store the data in legacy platform log files, database access files, and memory dumps associated with the legacy platform;

determining expected relevant data by determining different types of the relevant data;

updating the determined relevant data by:

finding a query statement that is used to access a particular type of the relevant data;

determining that the query statement is an outlier query statement based at least in part upon determining that the particular type of the relevant data is an outlier relevant data that is not among the expected relevant data; and excluding the outlier query statement from query statements used in determining the relevant data;

determining frequently used relevant data, wherein the relevant data is determined to be frequently used when the relevant data is used more than an occurrence threshold number in a particular time period by the legacy platform;

assigning a migration priority to the determined frequently used relevant data based at least in part upon a frequency of occurrence of the frequently used relevant data, wherein:

a first frequently used relevant data assigned with a high migration priority are migrated to the target platform before a second frequently used relevant data assigned with a low migration priority; and the frequency of occurrence of the frequently used relevant data is determined based at least in part upon a number of times the frequently used relevant data is used in the particular time period by the legacy platform, migrating the determined frequently used relevant data from the legacy platform to the target platform and preventing migration of the determined outlier relevant data from the legacy platform to the target platform, thereby improving accuracy in selecting the relevant data for the data migration; and removing unused and rarely used data from the legacy platform, thereby cleaning a database associated with the legacy platform from the unused data and the rarely used data.

10. The method of claim 9, wherein the frequently used relevant data comprises data in use, the method further comprises:

determining data-in-use stored in the memory dumps associated with the legacy platform, wherein the data-in-use is consistently in transit between the legacy platform and other platforms;

assigning a high migration priority to the data-in-use; and migrating the data-in-use from the legacy platform to the target platform.

11. The method of claim 9, wherein the method further comprises:

determining less frequently used relevant data, wherein the relevant data is determined to be less frequently used when the relevant data is used less than the occurrence threshold number in the particular time period by the legacy platform;

assigning a low migration priority to the less frequently used relevant data; and migrating the less frequently used relevant data from the legacy platform to the target platform after migrating the frequently used relevant data from the legacy platform to the target platform.

12. The method of claim 9, wherein determining the relevant data comprises:

searching for particular keywords used in query statements in one or more of the legacy platform log files, the database access files, and the memory dumps associated with the legacy platform, wherein the query statements are used to access the relevant data, the particular keywords comprise select, table, insert, and column;

determining whether results of the query statements are used for any purpose by the legacy platform; and in response to determining that the results of the query statements are used for at least one purpose by the legacy platform, determining that the data is relevant.

13. The method of claim 12, wherein determining the frequently used relevant data comprises:
    determining a number of times, the query statements are used to access the relevant data;
    determining whether the number of times the query statements are used to access the relevant data is higher than the occurrence threshold number in the particular time period; and
    in response to determining that the number of times the query statements are used to extract the relevant data is higher that the occurrence threshold number in the particular time period, determine that the relevant data is frequently used, wherein the particular time period is configurable.

14. The method of claim 9, wherein:
    the legacy platform log files comprise records of functions that have been performed by the legacy platform, wherein the functions comprise query statements to manage the data related to the legacy platform;
    the database access files comprise data that have been accessed by the legacy platform in performing the functions; and
    the memory dumps comprise data which have been generated from performing the functions by the legacy platform and configuration data which is used to enable the legacy platform to perform its functions.

15. A computer program comprising executable instructions stored in a non-transitory computer readable medium that when executed by a processor causes the processor to:
    receive, via a network, the data stored by the legacy platform;
    determine relevant data for data migration from among data stored by a legacy platform to a target platform, wherein:
        the relevant data is determined based at least in part upon whether the data stored by the legacy platform is used by the legacy platform, and
        the legacy platform is configured to store the data in legacy platform log files, database access files, and memory dumps associated with the legacy platform;
    determine expected relevant data by determining different types of the relevant data;
    update the determined relevant data by:
        finding a query statement that is used to access a particular type of the relevant data;
        determining that the query statement is an outlier query statement based at least in part upon determining that the particular type of the relevant data is an outlier relevant data that is not among the expected relevant data; and
        excluding the outlier query statement from query statements used in determining the relevant data;
    determine frequently used relevant data, wherein the relevant data is determined to be frequently used when the relevant data is used more than an occurrence threshold number in a particular time period by the legacy platform;
    assign a migration priority to the determined frequently used relevant data based at least in part upon a frequency of occurrence of the frequently used relevant data, wherein:
        a first frequently used relevant data assigned with a high migration priority are migrated to the target platform before a second frequently used relevant data assigned with a low migration priority; and
        the frequency of occurrence of the frequently used relevant data is determined based at least in part upon a number of times the frequently used relevant data is used in the particular time period by the legacy platform,
    migrate the determined frequently used relevant data from the legacy platform to the target platform and prevent migration of the determined outlier relevant data from the legacy platform to the target platform, thereby improving accuracy in selecting the relevant data for the data migration; and
    remove unused and rarely used data from the legacy platform, thereby cleaning a database associated with the legacy platform from the unused data and the rarely used data.

16. The computer program of claim 15, wherein the frequently used relevant data comprises data in use, the processor is further configured to:
    determine data-in-use stored in the memory dumps associated with the legacy platform, wherein the data-in-use is consistently in transit between the legacy platform and other platforms;
    assign a high migration priority to the data-in-use; and
    migrate the data-in-use from the legacy platform to the target platform.

17. The computer program of claim 15, wherein the processor is further configured to:
    determine less frequently used relevant data, wherein the relevant data is determined to be less frequently used when the relevant data is used less than the occurrence threshold number in the particular time period by the legacy platform;
    assign a low migration priority to the less frequently used relevant data; and
    migrate the less frequently used relevant data from the legacy platform to the target platform after migrating the frequently used relevant data from the legacy platform to the target platform.

18. The computer program of claim 15, wherein determining the relevant data comprises:
    searching for particular keywords used in query statements in one or more of the legacy platform log files, the database access files, and the memory dumps associated with the legacy platform, wherein the query statements are used to access the relevant data, the particular keywords comprise select, table, insert, and column;
    determining whether results of the query statements are used for any purpose by the legacy platform; and
    in response to determining that the results of the query statements are used for at least one purpose by the legacy platform, determining that the data is relevant.

19. The computer program of claim 18, wherein determining the frequently used relevant data comprises:
    determining a number of times, the query statements are used to access the relevant data;
    determining whether the number of times the query statements are used to access the relevant data is higher than the occurrence threshold number in the particular time period; and
    in response to determining that the number of times the query statements are used to extract the relevant data is higher that the occurrence threshold number in the particular time period, determine that the relevant data is frequently used, wherein the particular time period is configurable.

20. The computer program of claim 15, wherein:

the legacy platform log files comprise records of functions that have been performed by the legacy platform, wherein the functions comprise query statements to manage the data related to the legacy platform;

the database access files comprise data that have been accessed by the legacy platform in performing the functions; and the memory dumps comprise data which have been generated from performing the functions by the legacy platform and configuration data which is used to enable the legacy platform to perform its functions.

* * * * *